United States Patent Office 3,413,241
Patented Nov. 26, 1968

3,413,241
POLYHALOGENATED POLYMERIC (ARYL-ETHYLENE) DERIVATIVES
William M. Le Suer, Cleveland, and Carl W. Stuebe, Euclid, Ohio, assignors to The Lubrizol Corporation, Wickliffe, Ohio, a corporation of Ohio
No Drawing. Continuation-in-part of application Ser. No. 60,557, Oct. 5, 1960. This application Mar. 12, 1965, Ser. No. 439,427
5 Claims. (Cl. 260—2)

ABSTRACT OF THE DISCLOSURE

Polyhalogenated polymeric ($\alpha,\alpha'$-diarylethylene) derivatives are formed by reacting a poly(trihalomethyl)-substituted aromatic polymer with phosphorus in the presence of a halogen carrier such as hydrogen iodide. The polymers are useful as plasticizers and insecticides.

---

This application is a continuation-in-part of applications Ser. No. 779,285 filed Dec. 10, 1958, and now U.S. 2,960,542; Ser. No. 40,136 filed July 1, 1960, and now U.S. 3,004,076; Ser. No. 40,191 filed July 1, 1960, and now U.S. 3,084,203; Ser. No. 539,683 filed Oct. 10, 1955, and now abandoned; and Ser. No. 60,557 filed Oct. 5, 1960 now abandoned.

This invention relates to the preparation of halogen-containing aromatic compounds. In a more particular consideration, it relates to the preparation of such aromatic compounds which contain at least two aromatic nuclei. In a still more particular consideration, it relates to the preparation of halogen-containing polymeric aromatic compounds.

The alpha, alpha'-diaryl ethylene nucleus has received serious consideration because of its recently discovered value in many applications. It is found, for example, within the chemical structure of brightening agents, sex hormones, etc. In view of such applications the synthesis and further exploitation of such chemical structures is desirable.

The particular products of the process of this invention are alpha, alpha'-diaryl ethylenes in which there is attached also at least one halogen atom to each of the carbon atoms of the ethylene residue. For economic reasons, the process of this invention is particularly applicable to the preparation of alpha, alpha'-diaryl ethylenes in which there is attached at least one chlorine atom to each of the carbon atoms of the ethylene residue. Illustrative of such compounds are the alpha, alpha'-dichlorostilbenes which comprise a preferred type of product of this invention. Other such products include sym-diphenyltetrachloroethanes.

It is accordingly a principal object of this invention to provide polymeric halogen-containing aromatic compounds.

It is also an object of this present invention to provide polymeric halogen-substituted stilbenes.

It is also an object of the present invention to provide polymeric chlorine-containing bibenzyls.

It is further an object of this invention to provide polymeric aromatic compounds containing halogen-substituted stilbene or bibenzyl units.

Other objects will be apparent from the following description.

These and other objects are accomplished by providing a polymeric composition having a molecular weight of from about 1,000 to about 100,000 and consisting essentially of polymers having the structural formula

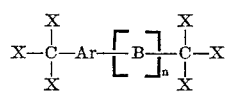

wherein Ar is aryl, B is selected from the class consisting of radicals having the structural formula

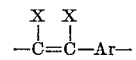

and radicals having the structural formula

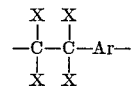

and X being a halogen selected from the class consisting of chlorine and bromine and $n$ having a value corresponding to the molecular weight of the polymeric composition.

The polymeric composition of this invention is obtained by the reaction of (a) a poly(trihalomethyl)-substituted aromatic compound having the structure $Ar(CX_3)_y$ where Ar is a non-functional aromatic radical attached to the carbon atom through a benzenoid carbon atom, X is a chlorine or bromine atom, and $y$ is an integer of at least 2; with (b) elemental phosphorus in the presence of a catalytic amount, usually from about 0.001% to about 5% of the combined weight of (a) and (b), of (c) a halogen carrier which may be, for instance, hydrogen iodide, iodine, iodine monochloride, phosphorus iodides, hydrocarbon iodides, ammonium iodides and metal halides in which the metal is selected from the group consisting of the metals of Groups I, II, III–B, IV, V–B, VI–A, VII–A and VIII.

The poly(trihalomethyl)-substituted aromatic compounds useful in preparing the polymeric compositions of this invention comprise principally bis- and tris-(trichloromethyl)-substituted and bis- and tris-(tribromoethyl)-substituted benzenes and naphthalenes. Such compounds may reailly be prepared by the halogenation of xylene, mesitylene, hemimellitene, pseudocumene, mellitene or a like polymethylbenzene or naphthalene. Other preparative methods such as alkylation of a bis(trihalomethyl)benzene or naphthalene may also be used. Illustrative examples of such poly(trihalomethyl)-substituted aromatic compounds are 1,4-bis(trichloromethyl)benzene, 1,2,3-tris(tribromomethyl)benzene, 1,3,5-tris(trichloromethyl)benzene, 1,4-bis(trichloromethyl)naphthalene, 1,3 - bis(trichloromethyl)phenanthrene, 1,3,5-tris(tribromomethyl)benzene, 1,3-bis(trichloromethyl)anthracene, m - bis(trichloromethyl)-naphthalene, etc.

It will be noted that in each of the above examples the aromatic residue is non-functional; i.e., it does not contain any functional groups which might take part in or interfere with the reaction of the hereindescribed process.

Although the physical characteristics of the elemental phosphorus which may be used in the process are not critical, it is preferred to use red phosphorus.

The product of the reaction of a poly(trihalomethyl)-substituted aromatic compound and phosphorus is polymeric and is characterized by the presence within its molecular structure of stilbene units or bibenzyl units or a mixture of such units. The terms "stilbene units" and "bibenzyl units" are used in a generic sense to designate units having the following structural formulas:

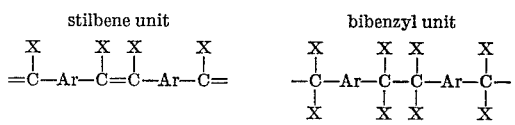

The relative amounts of reactants determine the character of the product which is available therefrom. The function of the phosphorus appears to be associated with its ability to abstract halogen from two molecules of trihalomethyl compound, the resulting by-product consisting largely of phosphorus trihalide which is readily removed from the reaction mixture by distillation. Accordingly, a high phosphorus to trihalomethyl compound ratio will result in a product having less halogen than in the case of a reaction mixture which contains a low phosphorus to trihalomethyl compound ratio.

Generally, when it is desired to prepare polymeric products having halostilbene units, a ratio of one mole of phosphorus to one mole of the trihalomethyl radical of the poly(trihalomethyl)-substituted aromatic compound is used. On the other hand, the use of one mole of phosphorus per three moles of the trihalomethyl radical results in the formation of a relatively large proportion of products having halo-bibenzyl units. It will be understood, of course, that since a poly(trihalomethyl) aromatic compound is used, the amount of phosphorus to be used varies in proportion to the number of the trihalomethyl groups present therein.

As indicated, the reaction is catalyzed by a halogen carrier selected from the group consisting of hydrogen iodide, iodine, iodine monochloride, phosphorus iodides, hydrocarbon iodides, ammonium iodides, and metal halides in which the metal is selected from the group consisting of the metals of Groups I, II, III–B, IV, V–B, VI–A, VII–A, and VIII.

Because hydrogen iodide is extremely volatile (boiling point of −35° C.), special care must be taken in using it as the catalyst for this reaction. It may be brought into contact with the reactants by introducing it beneath the surface of the reaction mixture at the desired reaction temperature while the mixture is being vigorously agitated; or it may be introduced into the reaction mixture in the form of an aqueous solution. In any event, however, a considerable proportion of un-utilized hydrogen iodide is usually lost through volatilization. When an aqueous solution of hydrogen iodide is used, it usually causes also excessive foaming. Hence, hydrogen iodide, although contemplated for use herein, is not so convenient as the other catalysts and is not preferred.

The phosphorous iodides useful as the catalyst in this invention may be exemplified by phosphorous tri-iodide, phosphorus di-iodide ($P_2I_4$), and phosphorus iodochloride ($PI_2Cl_3$), and also organic phosphonium iodides such as tetramethyl phosphonium iodide, tetraphenyl phosphonium iodide, dicyclohexyl phosphonium iodide, diphenyldiethyl phosphonium iodide, octyl phosphonium iodide, etc.

The hydrocarbon iodides useful as the catalyst in this reaction may be alkyl, alkaryl, cycloalkyl, arylalkyl, or aryl iodides. Specific catalysts belonging to this broad class may be exemplified by methyl iodide, ethyl iodide, iso-octyl iodide, dodecyl iodide, docosyl iodide, cyclopentyl iodide, 2-methylcyclohexyl iodide, phenyl iodide, phenyl iodide, benzyl iodide, p-heptylphenyl iodide, naphthyl iodide, etc.

The metal of the metal halides group of catalysts may be any metal of Groups I, II, III–B, IV, V–B, VI–A, VII–A, and VIII as shown in the "Periodic Classification of the Elements" in "Moeller's Inorganic Chemistry," Wiley, New York 1952, page 122. It will be noted that according to this classification Group I includes lithium, sodium, potassium, rubidium, cesium, francium, copper, silver and gold; that Group II includes beryllium, magnesium, calcium, strontium, barium, radium, zinc, cadmium and mercury; that Group III–B includes boron, aluminum, gallium, indium, and tantalum; that Group IV includes titanium, zirconium, hafnium, germanium, tin and lead; that Group V–B includes arsenic, antimony and bismuth; that Group VI–A includes manganese; and that Group VIII includes iron, cobalt, nickel, ruthenium, rhodium, palladium, osmium, iridium and platinum. All of these metals are contemplated in terms of their halides for the purposes of this invention. Specific examples of such metal halides coming within the scope of this definition of the catalysts intended for use in the process include lithium iodide, sodium iodide, potassium bromide, silver iodide, cesium iodide, beryllium iodide, magnesium bromide, strontium iodide, cupric iodide, gold chloride, cadmium iodide, gallium tribromide, indium trichloride, tantalum trifluoride, germanium trichloride, lead iodide, arsenic tri-iodide, bismuth chloride and antimony pentachloride.

Another class of iodides contemplated for use as the catalyst herein comprises ammonium iodides. The term "ammonium iodides" is used herein in a generic sense to designate a well-known class of chemical substances having the general formula,

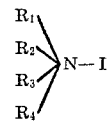

wherein $R_1$, $R_2$, $R_3$, and $R_4$ are each hydrogen or a hydrocarbon radical. This class encompasses quaternary ammonium iodides, the hydroiodes of amines, and the unsubstituted ammonium iodide ($NH_4I$) itself. The amine hydroiodides may be derived from primary, secondary, or tertiary amines of aliphatic, aromatic, or heterocyclic character. They may be illustrated more specifically by the hydroiodides of, for example, methylamine, dimethylamine, trimethylamine, hexylamine, dodecylamine, dinonylamine, pyridine, quinoline, piperazine, ethylenediamine, naphthylamine, pyrrole, morpholine, phenothiazine, p-dodecylaniline, dimethylaniline, 2-phenylethylamine, oleylamine, stearylamine, etc.

The quaternary ammonium iodides may likewise be derived from aliphatic, aromatic, or heterocyclic amines. Examples illustrating such compounds include tetramethyl ammonium iodide, tribenzyl methyl ammonium iodide, naphthyl trimethyl ammonium iodide, methyl pyridinium iodide, dicyclohexyl dibutyl ammonium iodide, triethyl p-heptylphenyl ammonium iodide, etc.

The catalyst is effective in very small amounts, as small as 0.001% of the combined weight of the trihalomethyl-substituted aromatic hydrocarbon compound and the elemental phosphorus reactant. The effectiveness of increased amounts of the catalyst seems to level off above about 5%. In most instances, the most effective amounts of the catalyst appear to be within the range of from about 0.1% to about 3% of the combined weight of the two reactants.

The reaction of the process requires somewhat elevated temperatures. The usual reaction will be run, for example, at a temperature within the range of 150° C. to 300° C., although within the limits imposed by the stability of the reactants the reaction may be carried out at even higher temperatures. Likewise, in some particular instances the process may be carried out at temperatures below 150° C., for example, at 125° C. In most cases, the reaction will require at least one hour. The progress of the reaction may be noted by the amount of phosphorus trihalide which distills from the reaction mixture, and when this distillation has ceased, it may be assumed that the reaction is complete. Usually all of the available phosphorus trihalide has been distilled within four or five hours. The reaction generally is carried out at atmospheric pressure although it may in some particular instance be carried out at super-atmospheric or reduced pressure.

When all of the phosphorus trihalide has distilled from the reaction mixture, there usually remains some unreacted phosphorus. This can be removed by adding an organic solvent such as benzene to the mixture and filtering the benzene solution from the phosphorus. Removal of the organic solvent from the filtrate by evaporation and subsequent distillation of the residue yields the desired product. The product may be purified further by crystallization from an organic solvent.

Again depending upon the relative amounts of reactants employed, the polymeric product may contain either dihalostilbene units or tetrahalobibenzyl units. When bis(trihalomethyl)benzene is used as the reactant, these units may be represented in the following Formulas A and B, respectively:

Formula A

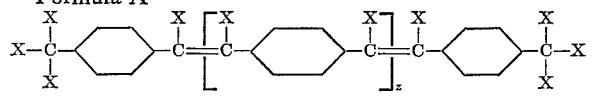

Formula B

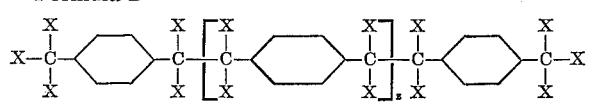

wherein X is a halogen atom and z is either zero or an integer the value of which depends upon the molecular weight of the polymer. Thus, it will be readily appreciated that when z is zero, the polymeric product is a dimer; when z is equal to one, the polymeric product is trimer; etc. In many instances, a mixture of polymers containing dihalostilbene units and polymers containing tetrahalobibenzyl units may be obtained. Also, it is possible to obtain interpolymers wherein both dihalostilbene and tetrahalobibenzyl units are present in a polymeric chain. In such instances, the polymers may be described by Formula C below:

Formula C

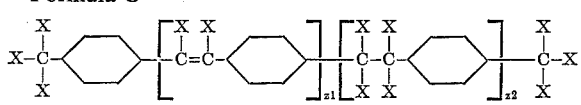

wherein the total value of $z_1$ and $z_2$ is equal to that of $z$ above. The exact composition of the polymeric product is not known. It will be noted that when a tris(trihalomethyl) aromatic compound is used as the reactant, the polymeric product will contain pendant or cross-linked chains.

The molecular size of the polymeric product may vary within broad ranges such as from that of a dimer of the trihalomethyl aromatic reactant to that of polymers having average molecular weights of 100,000 or even higher. In most instances, the molecular weight of the polymeric product is within the approximate range of 1,000 and 5,000.

The preparation of the polymeric compositions of this invention may be illustrated by the following examples. These examples describe the use of several representative catalysts which have been chosen solely for the purpose of illustrating the preferred process conditions in greater detail. It will be noted, of course, that the polymeric compositions are likewise obtainable by the use of other catalysts described hereinbefore. The utility of such catalysts has been more specifically demonstrated in copending applications Ser. No. 779,285 filed Dec. 10, 1958, now U.S. 2,960,542, Ser. No. 40,136 filed July 1, 1960, now U.S. 3,004,076, and Ser. No. 40,191 filed July 1, 1960, now U.S. 3,084,203.

Example 1

A mixture of 62.5 grams (0.2 mole) of p-bis(trichloromethyl)benzene, 3.2 grams (0.1 mole) of red phosphorus, 0.5 gram of hydrogen iodide (as 50% aqueous solution), and 150 grams of o-dichlorobenzene was heated at 185° C. five hours and then filtered. The filtrate yielded upon cooling an amorphous polymeric product having a chlorine content of 61.28% and an average molecular weight of 720.

Example 2

A mixture of 62 grams (0.2 mole) of bis(trichloromethyl)benzene, 4.5 grams (0.14 mole) of red phosphorus, 5 ml. of cyclohexyl iodide, and 300 grams of o-dichlorobenzene was heated at the reflux temperature (185° C.) for ten hours, during which time phosphorus trichloride was distilled from the mixture. Methanol was added to the distillation residue whereupon 26 grams of a solid polymeric product was obtained. The product was found to have a chlorine content of 43.2%.

Example 3

A mixture of 88 grams (0.4 mole) of bis(trichloromethyl)benzene, 4 grams (0.13) mole) of red phosphorus, 2.07 grams of pyridine hydroiodide, and 150 grams of o-dichlorobenzene was heated at 185° C. for six hours during which time phosphorus trichloride was distilled from the mixture. The distillation residue was filtered. Methanol was added to the filtrate, whereupon 43 grams of a solid polymeric product having a chlorine content of 57.4% was obtained.

Example 4

A mixture of 156.5 grams (0.5 mole) of p-bis(trichloromethyl)benzene, 31 grams (1.0 mole) of red phosphorus, and 0.23 gram of iodine was heated at 235° C. for two hours. A total of 48 grams of phosphorus trichloride was collected as distillate. The residue was extracted with benzene and this benzene extract was treated with methanol to precipitate 62 grame of polymeric product having a chlorine content of 52.5% and an average molecular weight of 1600.

Example 5

A mixture of 391 grams (2.0 moles) of benzotrichloride, 62 grams (2.0 moles) of red phosphorus and .01 gram of iodine was heated with stirring at 220° C. to 250° C. for four hours. During this time a total of 123 grams of phosphorus trichloride was collected as distillate from the reaction mixture. The residue was extracted with benzene leaving 25 grams of unreacted solid phosphorus. Concentration of the benzene extract yielded 250 grams of a dark brown solid residue which upon distillation yielded 225 grams of a distillate melting at 95° C. to 105° C. Analysis of this distillate indicated its chlorine content as 28.1%. The melting range of the product indicated it to be a mixture of cis- and trans-isomers of alpha,alpha'-dichlorostilbene.

The polymeric compositions of this invention are useful as plasticizers for polyvinyl chloride, as synergists for DDT, and as insecticides (e.g., water emulsion insecticidal composition comprising water containing 0.1–0.5% by weight of the product of Example 1, and 0.5–2% by weight of sodium dodecylbenzene sulfonate as the emulsifier).

What is claimed is:

1. A polymeric composition having a molecular weight of from about 1,000 to about 100,000 and consisting essentially of polymers having the structural formula

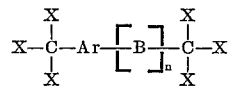

wherein Ar is aryl, B is selected from the class consisting of radicals having the structural formula

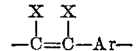

and radicals having the structural formula

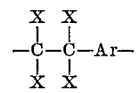

and X being a halogen selected from the class consisting of chlorine and bromine and $n$ having a value corresponding to the molecular weight of the polymeric composition.

2. A polymeric composition having a molecular weight of from about 1,000 to about 100,000 and consisting essentially of polymers having the structural formula

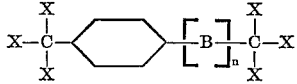

wherein B is selected from the class consisting of radicals having the structural formula

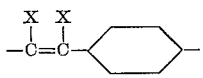

and radicals having the structural formula

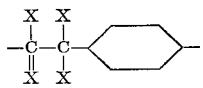

and X being a halogen selected from the class consisting of chlorine and bromine and $n$ having a value corresponding to the molecular weight of the polymeric composition.

3. A polymeric composition having a molecular weight of from about 1,000 to about 100,000 and consisting essentially of polymers selected from the class consisting of polymers having the structural formula

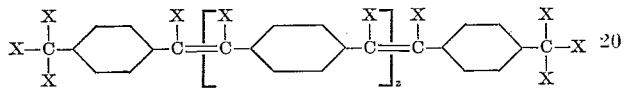

and polymers having the formula

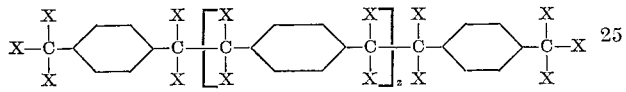

in each of said formulas X being a halogen selected from the class consisting of chlorine and bromine and $z$ having a value corresponding to the molecular weight of the polymeric composition.

4. A polymeric composition having a molecular weight of from about 1,000 and up to about 100,000 and consisting essentially of polymers having the structural formula

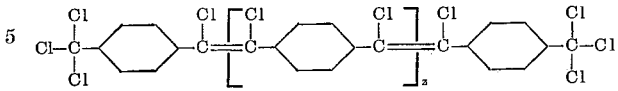

wherein $z$ has a value corresponding to the molecular weight of the polymeric composition.

5. A polymeric composition having a molecular weight of from about 1,000 and up to about 100,000 and consisting essentially of polymers having the structural formula

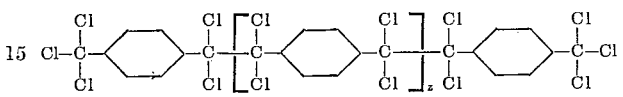

wherein $z$ has a value corresponding to the molecular weight of the polymeric composition.

References Cited

UNITED STATES PATENTS

| 2,914,489 | 11/1959 | Hall | 260—2 |
| 3,110,687 | 11/1963 | Smith | 260—2 |
| 3,240,722 | 3/1966 | Orttung et al. | 260—2 |
| 3,280,202 | 10/1966 | Gilch | 260—2 |

FOREIGN PATENTS 1,312,376  11/1962  France.

SAMUEL H. BLECH, *Primary Examiner.*